United States Patent [19]

Chovan

[11] 4,313,185

[45] Jan. 26, 1982

[54] ACOUSTIC VIBRATION SENSOR AND SENSING SYSTEM

[75] Inventor: Joseph L. Chovan, North Syracuse, N.Y.

[73] Assignee: General Electric Company, Syracuse, N.Y.

[21] Appl. No.: 108,861

[22] Filed: Dec. 31, 1979

[51] Int. Cl.³ .......................... H04R 1/44; G01B 9/02
[52] U.S. Cl. ...................................... 367/149; 73/657; 356/349; 367/140
[58] Field of Search ............... 367/140, 149; 356/349; 73/657

[56] References Cited

U.S. PATENT DOCUMENTS

| | | | |
|---|---|---|---|
| 3,782,176 | 1/1974 | Jacobs | 73/657 |
| 4,071,753 | 1/1978 | Fulenwider et al. | 367/140 |
| 4,193,130 | 3/1980 | Young et al. | 367/149 |

Primary Examiner—S. C. Buczinski

Attorney, Agent, or Firm—Richard V. Lang; Carl W. Baker

[57] ABSTRACT

A novel acoustic vibration sensor and novel acoustic vibration sensing system are described having principal application to hydrophones and operating upon the optical heterodyning principle. The sensor employs a pair of single mode fibers, optically coupled by a path whose length is varied by the acoustic vibrations, and including a partially reflecting discontinuity at the sensitive end of each fiber. Optical signals of one frequency are supplied to one fiber, and of another frequency to the other fiber. Optical signals of the same difference frequency emerge from the "dry end" of each fiber. When these two emergent signals are photodetected, and the phase or frequency difference is obtained, the acoustic vibration is sensed. The process effectively cancels out noise pickup in the single mode fibers and in other parts of the system, such as laser noise and oscillator instabilities.

10 Claims, 5 Drawing Figures

ACOUSTIC VIBRATION SENSOR AND SENSING SYSTEM

BACKGROUND OF THE INVENTION

1. Field of the Invention

The invention relates to acoustic vibration sensors and acoustic vibration sensing systems in general. The principal application of such sensors and sensing systems is to hydrophones which detect acoustic vibrations in water. Such devices may be used singly or in arrays for both detection and location of sources or scatterers of acoustic vibrations. The sensing achieves sub-angstrom unit sensitivity by use of optical techniques.

2. Description of the Prior Art:

A known acoustic sensor for the hydrophone application consists of a flat coil of single mode optical fibers designed to be supplied with optical energy from a laser. Impinging acoustic energy modulates the optical length of the coil and the change in optical length can be detected by heterodyning the acoustically modulated energy with energy offset by a fixed amount to form an optical heterodyne. The means of offsetting the optical frequency of the laser output is a Bragg modulator, which may be of conventional design. The process produces a pair of optical signals separated by the Bragg modulator frequency, and one of which is acoustically modulated by the vibrations being sensed. A photodetector to which the two optical signals are applied produces an output at the difference frequency. The acoustic signal may be recovered by phase or frequency modulation of the photodetector output.

An objection to known systems is the difficulty of avoiding stray noise pick up in the connections made to the acoustic sensors.

SUMMARY OF THE INVENTION

Accordingly, it is an object of the invention to provide an improved optical acoustic vibration sensor.

It is an additional object of the present invention to provide an improved optical hydrophone.

It is a further object of the present invention to provide a novel optical acoustic vibration sensor in which stray noise pick up is minimized.

It is still another object of the present invention to provide an improved optical acoustic vibration sensing system.

It is an additional object of the present invention to provide an improved optical hydrophone system.

It is another object of the present invention to provide an improved optical acoustic vibration sensor system in which stray noise pick up is minimized.

These and other objects of the invention are achieved in a novel acoustic sensor which comprises two single mode optical fibers extending into the sensing region. Means are provided in the sensing region for exchanging optical energy between the fibers including a first partially reflecting discontinuity which reflects optical energy in the first fiber backward from the sensing region, and a second partially reflecting discontinuity which reflects optical energy in the second fiber backward from the sensing region. The sensor includes means for modulating the length of the optical coupling path between fibers for response to acoustic vibrations.

In one embodiment, the first and second partially reflecting discontinuities may be the "sensor" ends of the fibers. The coupling path length is made subject to modulation by acoustic signals by supporting both fibers end to end with freedom to be displaced along the optical path between them, and employing resilient diaphragms which deform in response to the acoustic energy as the supports.

In another sensor embodiment, the optical coupling paths between fibers is a coiled single mode optical fiber subject to the acoustic vibrations being sensed.

A novel hydrophone system in accordance with the invention comprises a sensor of the type described above and includes a coherent optical light source at an optical frequency ($f_o$), an optical Bragg modulator for producing a second beam having an optical frequency, e.g. ($f_o+f_w$), offset from that of the source, a pair of beamsplitting means, a pair of photodetectors, and means for measuring the phase or frequency difference between the photodetector outputs.

The first beamsplitting means couples energy ($f_o$) from the light source in a first sense through the first beamsplitting means into the first fiber for application to the sensor; and couples energy out of the first fiber, which includes energy ($f_o$) reflected back from the first partially reflecting discontinuity and energy ($f_o+f_w$) coupled from the second fiber; impinging in an opposite sense on the first beamsplitting means.

The second beamsplitting means couples energy ($f_o+f_w$) from the second beam in a first sense through the second beamsplitting means to the second fiber for application to the sensor; and couples energy out of the second fiber, which includes energy ($f_o+f_w$) reflected back from the second partially reflecting discontinuity and energy ($f_o$) coupled from the first fiber, impinging in an opposite sense on the beamsplitting means.

The two photodetectors each respond to energy at the difference frequency ($f_w$) impinging in opposite senses on the two beamsplitting means, and their outputs are coupled to means for determining the instantaneous phase or frequency difference between the outputs to obtain an acoustic signal measurement. The arrangement provides a measurement dependent on changes in the optical path length occurring between the partially reflecting discontinuities and substantially independent of acoustic interference occurring outside the partially reflecting discontinuities.

One may also employ a system having two optical Bragg modulators, or one in which a pair of four port directional coupling light modulators are employed.

BRIEF DESCRIPTION OF THE DRAWINGS

The novel and distinctive features of the invention are set forth in the claims appended to the present application. The invention itself, however, together with further objects and advantages thereof may best be understood by reference to the following description and accompanying drawings in which:

DESCRIPTION OF THE PREFERRED EMBODIMENT

Figure 1:
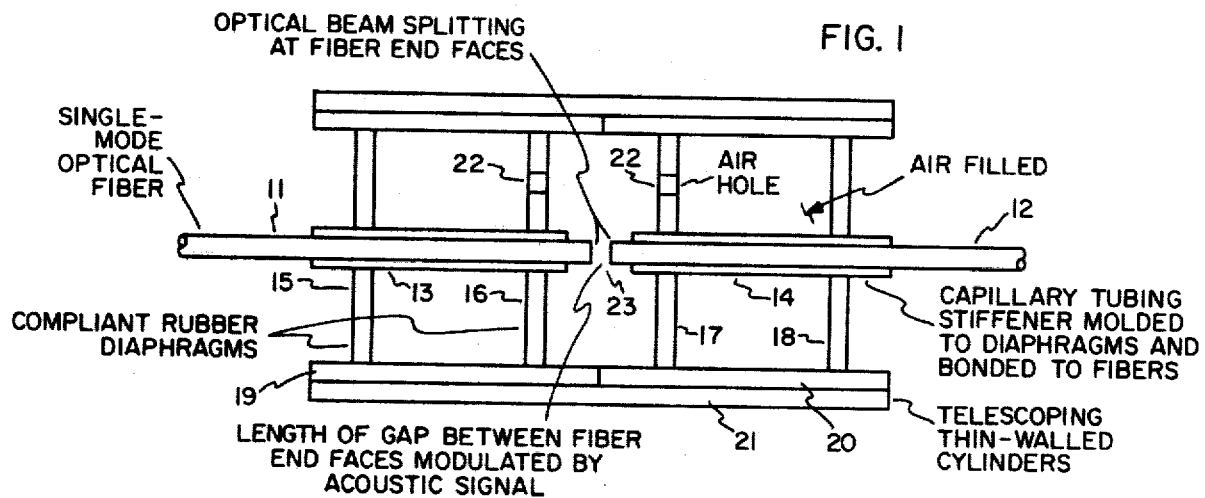
FIG. 1 is a mechanical illustration of an optical hydrophone suitable for shallow water operation.

Referring now to FIG. 1, an optical hydrophone 10 suitable for use in an optical heterodyning system is shown. The hydrophone, which is a sensor for acoustic vibrations in a water medium comprises a first single mode optical fiber 11, a second single mode optical fiber 12, arranged coaxially with the first fiber, and end to end, with the two fibers being resiliently supported for mutual coaxial motion. More particularly, the two fibers are each supported in a pair of stiff capillary tubing sleeves 13, 14, each of the latter supported in a pair of resilient diaphragms (15, 16, 17, 18) molded to a rigid cylindrical supporting structure. The supporting structure consists of two inner cylinders 19, 20 nested in an outer cylinder 21. The inner diaphragms are perforated as shown at 22 to avoid internal pressure differentials, and filled with air to a pressure suitable for use at a given hydrostatic pressure. The air pressure permits the use of less stiff diaphragms and leads to a more highly compliant design. When immersed in water and subjected to acoustic vibrations in the water, the fibers are designed to be forced toward one another with the gap 23 between the fibers narrowing or widening in response to the incident acoustic energy.

The mechanical design of the sensor is selected for responsiveness to very small amplitude acoustic vibrations at frequencies from approximately 110 Hz to several kilohertz. The useful upper frequency limit is normally less than 20 KHz. Displacement on an order of a tenth of an angstrom ($10^{-4}$ radians of optical phase modulation) may be sensed by the present sensor. An exemplary sensor, typically 1" long by $\frac{3}{8}$" diameter using 1/16" diaphragms of RTV rubber manufactured by the General Electric Company is responsive from very low frequencies ($\simeq$dc) to several kilohertz and is non-directional at the lower frequencies.

The acoustic vibration sensor 10 relies upon mechanical displacements large enough to produce a measurable phase modulation of the coherent light which is supplied to the sensor. In addition, the sensor contains a novel measure—its provision of two partially reflecting discontinuities, which provides substantial immunity to acoustic noise pick up by the fibers leading to the sensor and to noise at the laser source. In the FIG. 1 arrangement, these discontinuities occur at the ends of the single mode fibers terminating in air within the sensor. The two fibers are oriented at a spacing of from 0.005 to 0.010 inches to couple a small percentage of the light from one fiber to the other and vice versa. At the same time, the sensor end of each fiber is designed to reflect backwards a comparable percentage (typically 4%) of any light traveling along the fiber, which is a result of the difference in the index of refraction at the fiber-air interface inside the sensor.

When coherent light is supplied to the acoustic sensor, and the sensor is subjected to acoustic vibrations, the light will become phase or frequency modulated. The air gap will respond to the sensed vibration by a change in length. Assuming other parameters are unchanged, any light which crosses the gap, will experience an increase or decrease in phase depending on whether the gap is shorter or longer. In frequency terms, depending on whether the gap is shortening or lengthening the light will experience an increase or decrease in frequency. If light acoustically modulated in the sensor is heterodyned by a reference component, offset from the original optical frequency and not subject to the same modulation, then demodulation of the heterodyne provides a means of sensing instantaneous gap dimensions or gap motion at the sensor.

Figure 2:
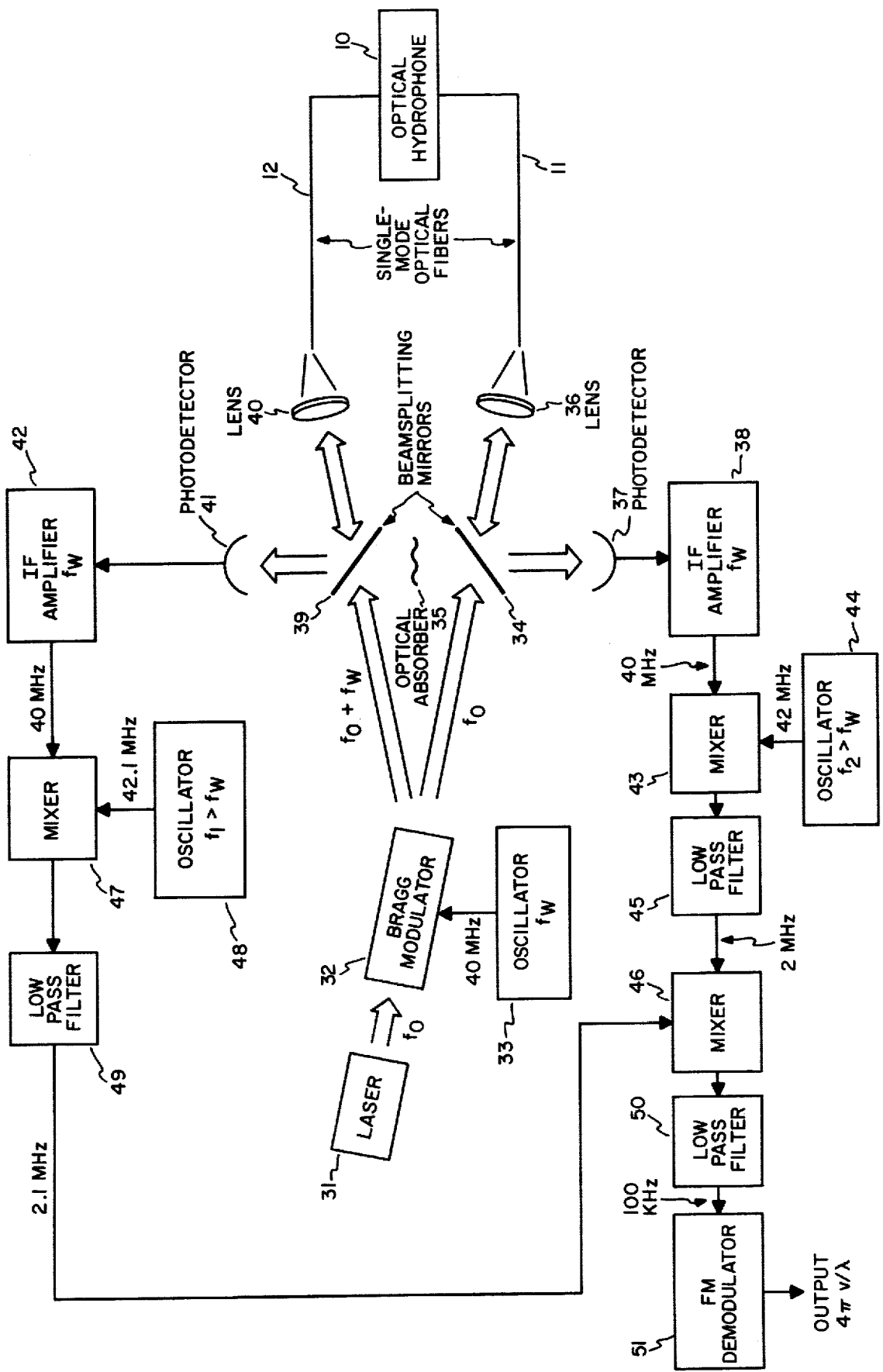
FIG. 2 is a block diagram of an optical heterodyne hydrophone system which may utilize the hydrophone illustrated in FIG. 1.

The system illustrated in FIG. 2 is designed to supply the required optical energy to the sensor and the means for detecting the modulation occurring at the sensor in order to sense acoustic vibrations. In accordance with the invention, the heterodying process is carried out in respect to light passing in both directions across the gap. As will be shown, this permits one to design a system which is substantially immune to interference not occurring between the partially reflecting discontinuities.

Referring both to FIGS. 1 and 2, the following optical components are supplied to and derived from the sensor 10. Optical energy at a first frequency $f_o$, is fed to the first fiber 11, and optical energy at a second frequency $(f_o+f_w)$ is fed to the second fiber 12. At the same time, energy is extracted from the first fiber 11 representing energy at frequency $f_o$ reflected backwardly from the sensor end of the first fiber, and energy at frequency $(f_o+f_w)$ transmitted from the second fiber across the sensor gap to the first fiber. Similarly, energy is extracted from the second fiber 12 representing energy at frequency $(f_o+f_w)$ reflected backwardly from the sensor end of the second fiber and energy at frequency $f_o$ transmitted to the second fiber across the sensor gap from the first fiber.

The optical system illustrated in FIG. 2 comprises an optical heterodyne system having a single Bragg modulator from which the two components $(f_o)$, $(f_o+f_w)$ are directionally coupled to the lower and upper terminals respectively of the sensor; two photodetectors also directionally coupled to the sensor, one responding to the components exiting from the lower fiber (11) and the other responding to the two components exiting from the upper fiber (12); means to obtain the phase or frequency difference between the two photodetector outputs at IF frequency $f_w$. As will be explained, this process provides substantial immunity to noise pick up on the fiber connections to the sensor as well as other advantages.

Referring now to FIG. 2, an optical laser 31 is provided to supply coherent optical energy to Bragg modulator 32. The Bragg modulator is supplied with electrical energy at 40 megahertz from the oscillator 33, and develops acoustic vibrations which modulate the incident light by the same frequency. The laser may be a commercial gas laser using helium neon as the gas. Both the Bragg modulator and the oscillator 33 may be of conventional commercial design. The zero order output of the Bragg modulator (which is unmodulated by 40 MHz vibrations) is coupled to a first beamsplitting mirror 34. The mirror 34 is designed to reflect half of the incident energy and transmit the other half. Reflected energy is coupled to an energy absorber 35 where it is dissipated. The transmitted half, which is used, passes through the mirror 34 to a lens 36. The lens 36 is a 40 power microscope objective, which focuses the laser beam on the end of the optical fiber 11 for coupling to the sensor 10. The optical fiber is embedded in an optical index matching medium to minimize reflections back from the input face of the fiber. Glycerine has proven to be suitable. Conversely, the lens 36 couples light exiting from the fiber 11 to the beamsplitting mirror 34 where a useful half is reflected to the photodetector 37. The two optical components $(f_o)$, $(f_o+f_w)$ supplied from the fiber 11 to the photodetector 37 differ in frequency by the Bragg modulation frequency, with one component ($f_o+f_w$) being further modulated a few kilohertz in the acoustic sensor 10. Accordingly, the photodetector 37 is designed to respond to the Bragg modulator frequency and to produce a signal on the Bragg carrier containing an additional modulation attributable to the sensed acoustic vibrations. The output of the photodetector 37 is coupled to an amplifier 38 whose center frequency is also at the Bragg modulation frequency. The signal is amplified in 38 to a sufficiently high level for subsequent processing.

The optical component ($f_o+f_w$) referred to above, which is applied to fiber 12 and exits from the fiber 11, is derived from the first order output of the Bragg modulator. More particularly, the first order output of the Bragg modulator (i.e., that which is frequency shifted by 40 MHz acoustic vibration) is coupled to a second beamsplitting mirror 39. The mirror 39 is designed to reflect half of the incident energy and transmit the other half. The reflected energy is coupled to the reverse surface of the energy absorber 35, where it is dissipated, while the transmitted energy, which is used, passes through the mirror 39 to the lens 40. The lens 40 focuses the beam on the end of the acoustic fiber 12 for coupling to the sensor 10. The optical fiber is embedded in an optical index matching medium to minimize any reflections back from the input face of the fiber. Glycerine has proven to be suitable. The light then passes through the sensor where it is subject to modulation in the gap in response to the acoustic vibrations being sensed and then exits from the single mode fibers 11.

The second photodetector 41 responds to a second optical heterodyne having the same Bragg modulation frequency, with the ($f_o$) component being further modulated in the acoustic sensor. More particularly, the lens 40 couples light exiting from the fiber 12 to the beamsplitting mirror 39 where a useful half is reflected to the photodetector 41. The light exiting from the fiber 12 contains light originally coupled from the zero order Bragg output ($f_o$) through the lower beamsplitting mirror 34, the lens 36, the lower fiber 11, the sensor 10, to the upper fiber 12. This component remains at $f_o$ except to the extent it is modulated in sensor 10 by acoustic vibrations. The second light component exiting from the fiber 12 is that provided from the first order output of the Bragg modulator ($f_o+f_w$) which is transmitted through the beamsplitting mirror 39, the lens 40, the single mode fiber 12, is reflected backwardly from the sensor end of the fiber 12 and re-exits from the fiber 12. Thus, the photodetector 41 has impinging upon it a pair of components differing in frequency by the Bragg modulator frequency, with one component ($f_o$) being subject to further modulation in the acoustic sensor 10. The output of the photodetector 41 is coupled to the amplifier 42 whose center frequency is at the Bragg modulation frequency. The amplifier amplifies the signal to a sufficiently high level for subsequent processing.

The sensor outputs to the two photodetectors are in opposite senses so that simple subtraction of the instantaneous phase or frequency of the photodetector outputs at IF of 40 MHz provides a doubling of the output indication. If the sensor position (or motion) corresponds to an increase in phase (or frequency) of the higher frequency optical component, e.g. ($f_o+f_w$), then the phase (or frequency) of the detected heterodyne will also increase. The same sensor position (or motion) will also occasion an increase in phase (or frequency) of the lower frequency component, e.g. ($f_o$) causing the phase (or frequency) of the detected heterodyne to decrease. In short, the phase or frequency of the two heterodynes change in opposite senses and when they are subtracted, a double output indication is obtained.

It should be emphasized that the desirable property of the network for processing the photodetector outputs, that of obtaining an instantaneous phase or frequency difference between two sinusoidal time variant quantities, is not a simple difference between these quantities, but rather a quantity ideally independent of the amplitudes of these quantities, and ideally dependent on only one and not both of the quantities within the argument of the function, i.e. the frequency or phase. In FIG. 2 the elements 43–51 constitute a means for measuring the instantaneous frequency difference between the photodetector outputs. This means is effective, but combersome. Alternatively, one could provide a standard instantaneous phase difference measuring device, now available in integrated form.

The optical heterodyne hydrophone system illustrated in FIG. 2 is completed by the means 43 through 51 which sense the instantaneous frequency difference between the IF outputs of the two optical detectors 37 and 41. A principal advantage of this method of sensing the acoustic signal is that it provides substantially complete immunity to system noise not derived from the hydrophone itself.

Continuing now with a description of the FIG. 2 system, the output of the amplifier 38 is coupled to a mixer 43 to which oscillations at 42 MHz are also supplied from the oscillator 44. The mixed output at a frequency of approximately 2 MHz is coupled through a low pass filter 45 to a first input of the second mixer 46. Similarly, the output of the amplifier 42 is coupled to a mixer 47 where it is mixed with oscillations from a further oscillator 48 at a frequency of 42.1 MHz. The mixed output at 2.1 MHz is coupled through a low pass filter 49 to a second input of the mixer 46. An output signal on a 100 KHz carrier appears at the mixer output. The output is coupled to a third low pass filter designed to pass frequencies below a few hundred kilohertz. The filtered signal is then coupled to an FM demodulator 51 which produces a voltage whose amplitude varies with the frequency modulation of the 100 KHz signal. Typical detected sonic vibrations produce a modulation of a few kilohertz upon the 100 kilohertz carrier.

Figure 3:
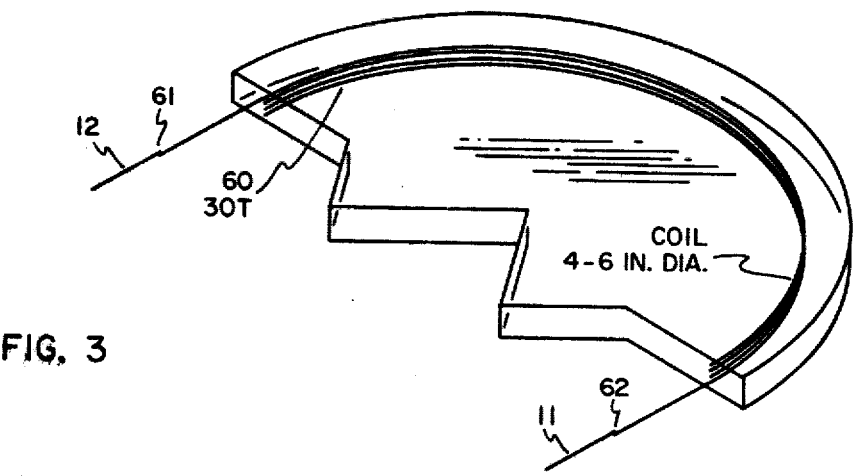
FIG. 3 is a mechanical illustration of a second optical hydrophone suitable for use in deep water.

The sensor illustrated in FIG. 1, while extremely simple, has a narrow range of useful depths. An arrangement having a greater range in depths is depicted in FIG. 3. The sensor consists of a flat helix 60 of single mode optical fiber having a diameter of about 4" to 6" and consisting of about 30 turns. The sensor may be potted in a plastic compound having the approximate acoustic impedance of water in which the acoustic waves being sensed propagate. The effect of a change in pressure upon the fiber is observed to change its optical length, the effect being in part a direct change in density which changes the refractive index and speed of light in the fiber. At either end of the sensor, a partially reflecting discontinuity 61, 62 is provided. These discontinuities may be achieved by a construction similar to that of the sensor in FIG. 1, with the fiber at the discontinuity supported with a fixed, minimum separation to achieve a higher degree of through coupling. Optionally, the two fibers may be welded together with a small offset.

Greater through coupling at the discontinuity is desirable when two discontinuities are required.

Figure 4:
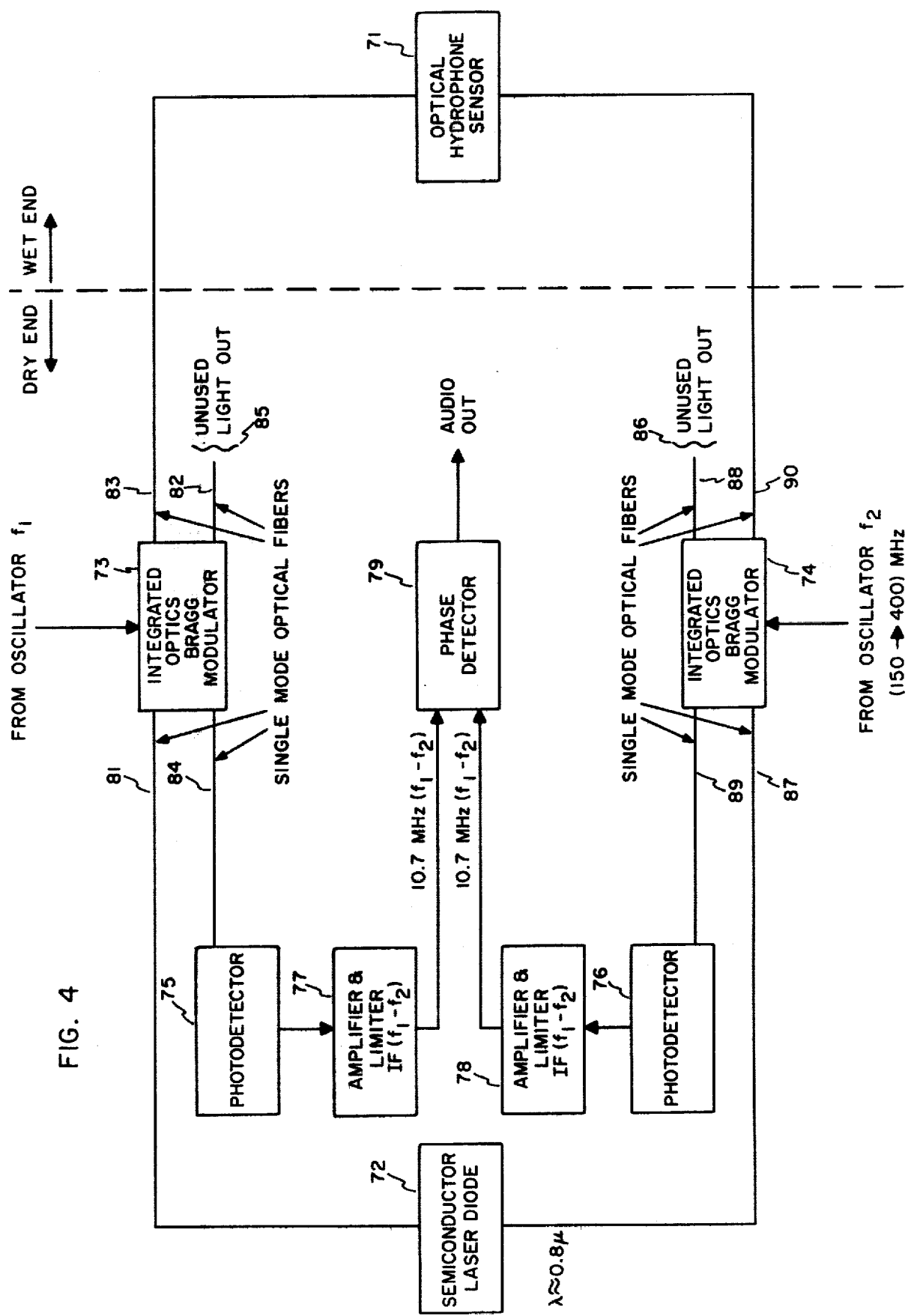
FIG. 4 is a block diagram of an alternate optical heterodyne hydrophone system employing a pair of optical heterodyning elements.

The present invention also permits one to employ integrated optics Bragg modulators with separate oscillators. Such a system is illustrated in the block diagram of FIG. 4. In FIG. 4, the optical hydrophone, sensor which is shown at 71, may take the form shown in either FIGS. 1 or 3, and should include two partially reflecting discontinuities suitable for making the final phase difference measurement. The optical heterodyne hydrophone system of FIG. 4 includes a semiconductor laser diode 72 which couples energy to a first and a second integrated optics Bragg modulator 73 and 74 respectively.

The modulator 73 is provided with oscillations at the frequency $f_1$ from an oscillator not separately shown, while the modulator 74 is provided with oscillations at the frequency $f_2$ from an oscillator also not separately shown. The modulator 73 is a four port device in which the ports are single mode fibers. In the modulator 73, the diagonal ports 81 and 82 and the diagonal ports 83 and 84 are coupled in the absence of oscillation or for the zero order Bragg component when oscillations are present. Output from the laser 72 is supplied to port 81 where the zero order component is coupled to port 82 and dissipated in the loss element 85. When oscillations are supplied at frequency $f_1$ to 73, a portion of the energy otherwise available at the port 82 is diverted to the port 83 and shifted in frequency by an amount equal to the oscillator frequency ($f_1$). The intensity of local oscillations is normally adjusted to provide an approximately equal division of energy between the ports 82 and 83. The single mode fiber 83 supplies energy to the upper connection to the optical hydrophone sensor 71 (using the orientations of FIG. 4). In a similar manner, laser output is coupled to modulator port 87 and the zero order component from the modulator 74 appears at the single mode fiber 88 which is coupled to loss element 86. Under the influence of oscillations at frequency $f_2$ about half of the energy into port 87 and derived from the laser 72 is diverted from the loss element 86 to the single mode fiber 90, which supplies energy to the lower connection to the sensor 71. The energy coupled to sensor 71 at the upper and lower connections are shifted by the frequencies $f_1$ and $f_2$. The difference in frequency between the external oscillators ($f_1=f_2$) is set to be a low value, as for instance 10.7 MHz, to permit the photodetectors 75, 76 to operate at a lower frequency than the higher frequency at which Bragg modulators of integrated design are required to operate. In practice, the frequencies $f_1$ and $f_2$ should lie in the range of from 150–400 MHz for convenient modulator design.

The two optical components exiting from the upper sensor fiber into the modulator port 83 contains a first heterodyne term at a frequency ($f_o=f_2$) modulated by the acoustic signal in the sensor and a second heterodyne term not modulated by the acoustic signal in the sensor at a frequency ($f_o-f_1$). These two components are coupled from port 83 to the diagonal port 84 without further modulation to the photodetector 75, which produces an output at the difference frequency ($f_1-f_2$). The frequency difference between these two components is 10.7 MHz. The photodetector output is coupled to an amplifier limiter 77 tuned to the 10.7 MHz center frequency. The two optical components exiting from the lower sensor fiber into the modulator port 90 contain a heterodyne term at frequency ($f_o-f_1$) modulated by the acoustic signal in the sensor and a second heterodyne term at frequency ($f_o-f_2$) without acoustic signal modulation in the sensor. These two components are then coupled unmodulated through the modulator 74 to the photodetector 76, which produces an output at the difference frequency ($f_1-f_2$). The photodetector output is then coupled to the amplifier limiter 78 tuned to the same difference frequency. The outputs of the two amplifier limiters 77, 78 are coupled to a phase detector 79 which measures the phase difference between the detected signals and provides a measurement of the sensed vibrations, independent of noise developed in the coupling path to the sensor 71, and independent of noise in the laser source.

The integrated optics Bragg modulators 73, 74 are not in themselves the subject of the present invention. In practice, a pair of Bragg modulators of another design, such as the conventional Bragg modulator referred to in connection with FIG. 2, may also be employed in a system of the type described in FIG. 4. The disadvantage of using conventional Bragg modulators in such a system is the large increase in size, without a clear performance advantage.

Figure 5:
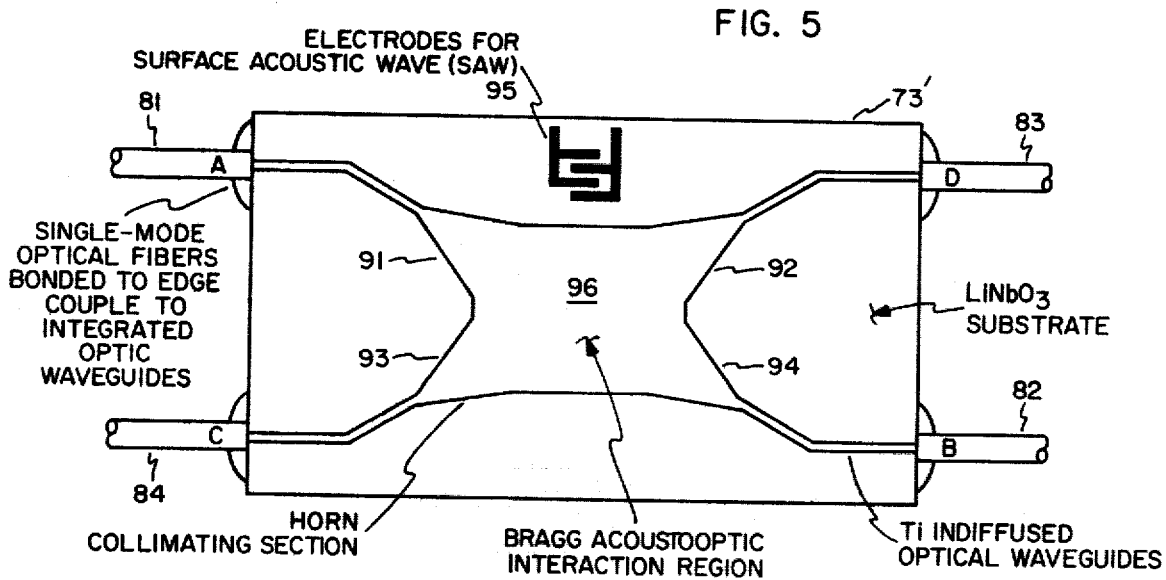
FIG. 5 is a simplified mechanical illustration of an integrated optics heterodyning means.

A suitable integrated optics directional coupler, modulator 73' is depicted schematically in FIG. 5. The properties of the single mode fiber ports have been described above and bear the same reference numerals 81–84 as in FIG. 4.

The modulator 73' is constructed on a suitable piezoelectric substrate, typically lithium niobate (LiNbO$_3$). At the upper surface electroding 95 is provided for launching an acoustic surface wave at a suitable Bragg modulator frequency which passes through the central Bragg acoustic optic interaction region 96. The interaction region 96 and the optical elements coupling light to it are formed by a titanium "diffused in" surface layer of approximately the thickness of the single mode fibers to form a channel waveguide region. The greater index of refraction of the "indiffused" region confines the optical energy to the surface layer for interaction with the acoustic waves. The diagonal fiber pairs 81, 82 and 83, 84 are coupled to collimating horns 91–94 disposed so that efficient straight through light propagation is achieved. The adjacent horn pairs 91, 92 and 93, 94 are disposed at the correct angle for efficient coupling of the Bragg first order component between them.

While the individual photodetector outputs may be demodulated at the individual amplifier outputs and then subtracted to obtain a double output, the arrangement is less satisfactory than the method herein employed in which the photodetector outputs are left undetected until they have been subtracted. The prior approach is subject to error from the inability to exactly match the gains in the demodulator channels. Any amplitude mismatch in the separate channels results in imperfect cancellation of the unwanted noise when the signal components are subtracted.

In the present method (e.g. FIG. 2), the photodetector outputs are heterodyned to different intermediate frequencies (2.1 MHz, 2 MHz) and these are in turn mixed and the difference frequency (0.100 MHz) is used. In mixing to this difference frequency, the instantaneous phase in the two detector channels are also subtracted. This implements the desired subtraction to obtain the desired sensed signal, and at the same time cancels the common noise phase modulation induced along the fiber lengths without critical dependence on balance in the prior electronic processing.

The two channels should be of approximately the same optical length and the differential time shifts should be a few nanoseconds or less. In a practical case, assuming no signals above a few kilohertz, the path limit differential should be no more than a few feet.

In one embodiment with path length equality of less than a few centimeters, gross displacements of the individual fibers, or both fibers together, had no detectable effect on the output at 1.5 KHz, although they completely masked the signal in either channel. The arrangement illustrated in FIGS. 1 and 2 has adequate sensitivity to sense background sea noise at sea state 0 (quiet sea). Acoustic wave sensitivities of about 0.1 angstroms have been achieved. This is several orders of magnitude poorer than the theoretical limit.

I claim

1. An acoustic vibration sensor comprising:
   A. a first single mode optical fiber extending to the sensing region,
   B. a second single mode optical fiber extending to said sensing region,
   C. means at said sensing region coupling optical energy from said first fiber to said second fiber including a first partially reflecting discontinuity which reflects optical energy in said first fiber backward from the sensing region,
   D. means at said sensing region coupling optical energy from said second fiber to said first fiber including a second partially reflecting discontinuity which reflects optical energy in said second fiber backward from the sensing region, and
   E. means for modulating the length of said optical coupling paths between fibers in response to the acoustic vibrations in said sensing means.

2. A sensor as set forth in claim 1 wherein said first partially reflecting discontinuity is the end of said first fiber at the sensing region, said second partially reflecting discontinuity is the end of said second fiber at the sensing region and the optical path coupling said fiber ends is said modulating path.

3. A sensor as set forth in claim 2 wherein said coupling path length modulating means comprises:
   A. means for supporting one fiber with freedom to be displaced along the optical path to the other fiber, and
   B. means for coupling acoustic energy to said support to cause said displacement in response to incident acoustic energy.

4. A sensor as set forth in claim 2 wherein said coupling path length modulating means comprises:
   A. means for supporting each fiber with freedom to be displaced along the optical path to the other fiber, and
   B. means for coupling acoustic energy to said supports to cause said displacements in response to incident acoustic energy.

5. A sensor as set forth in claim 4 wherein said fibers are coaxially supported with abutting fiber ends, each support comprising a resilient diaphragm allowing mutual displacement of the fiber ends in response to incident acoustic energy.

6. A sensor as set forth in claim 1 wherein the optical coupling paths between fibers is a coiled single mode optical fiber subject to said acoustic vibrations.

7. A sensor as set forth in claim 7 wherein said first partially reflecting discontinuity is an end of said first fiber optically coupled to one end of said coiled fiber, and said second partially reflecting discontinuity is an end of said second fiber optically coupled to the other end of said coiled fiber.

8. A hydrophone system comprising:
   A. a sensor as set forth in claim 1,
   B. a coherent optical light source producing a first beam having an optical frequency ($f_o$),
   C. an optical modulator for producing a second beam having an optical frequency ($f_o+f_w$),
   D. a first beamsplitting means for coupling energy ($f_o$) from said light source in a first sense through said first beamsplitting means into said first fiber for application to said sensor, the energy out of said second fiber, which includes energy ($f_o+f_w$) reflected back from said second partially reflecting discontinuity and energy ($f_o$) coupled from said first fiber, impinging in an opposite sense on said beamsplitting means,
   E. a first photodetector responding to energy at the difference frequency ($f_w$) impinging in said opposite sense on said first beamsplitting means,
   F. a second photodetector responding to energy at the difference frequency ($f_w$) impinging in said opposite sense on said second beamsplitting means, and
   G. means for determining the instantaneous phase or frequency difference between the output of said respective photodetectors to obtain an acoustic measurement primarily dependent on changes in the optical path length occurring between said partially reflecting discontinuities at said sensor.

9. A hydrophone system comprising:
   A. a sensor as set forth in claim 1,
   B. a coherent optical light source having an optical frequency ($f_o$),
   C. a first optical modulator coupled to said coherent light source for producing a first beam having an optical frequency ($f_o+f_1$),
   D. a second optical modulator coupled to said coherent light source for producing a second beam having an optical frequency ($f_o+f_2$),
   E. A first beamsplitting means for coupling energy at frequency ($f_o+f_1$) from said first modulator in a first sense through said first beamsplitting means into said first fiber, which includes energy at frequency ($f_o+f_1$) reflected back from said partially reflecting discontinuity and energy at frequency ($f_o+f_2$) coupled from said second fiber, impinging in an opposite sense on said first beamsplitting means,
   F. a second beamsplitting means for coupling energy at frequency ($f_o+f_2$) from said second modulator in a first sense through said second beamsplitting means to said second fiber for application to said sensor, the energy out of said second fiber, which includes energy at frequency ($f_o+f_2$) reflected back from said second partially reflecting discontinuity and energy at frequency ($f_o+f_1$) coupled from said first fiber, impinging in an opposite sense on said beamsplitting means,
   G. a first photodetector responding to energy at the difference frequency ($f_1-f_2$) impinging in said opposite sense on said first beamsplitting means,
   H. a second photodetector responding to energy at the difference frequency ($f_1-f_2$) impinging in said opposite sense on said second beamsplitting means, and
   I. means for determining the instantaneous phase or frequency difference between the output of said respective photodetectors to obtain an acoustic measurement primarily dependent on changes in the optical path length occurring between said partially reflecting discontinuities at said sensor.

10. A hydrophone system comprising:
A. a sensor as set forth in claim 1,
B. a coherent optical light source producing a first beam having an optical frequency ($f_o$),
C. a first and a second four port directional coupling light modulator in which diagonal pairs or ports (a, b; c, d) have maximum light coupling means when acoustic energy is not present; in which two adjacent pairs of ports (a, d;, c, b) have partial light coupling when acoustic energy is present, the coupling producing acoustic light modulation, and in which two adjacent pairs of ports (a, c; b, d) are uncoupled.
D. means for coupling optical energy from said light source to one port (a) of each modulator,
E. means coupling the first fiber of said sensor to the port (d) of said first modulator at which acoustically Bragg modulated light appears; means coupling the second fiber of said sensor to the port (d) of said second modulator at which acoustically Bragg modulated light appears,
F. means coupling a first photodetector to the port (c) diagonal to said first fiber connected port (d) of said first modulator for coupling energy from said first fiber thereto; means coupling a second photodetector to the port (c) diagonal to said second fiber connected port (d) of said second modulator for coupling energy from said second fiber thereto.
G. means for determining the instantaneous phase or frequency difference between the output of said respective photodetectors to obtain an acoustic measurement primarily dependent on changes in the optical path length occurring between said partially reflecting discontinuities at said sensor, and
H. means for dissipating the optical energy out of port (b) of said first and second modulators so that no energy is reflected back into port (b) of said first and second modulators.

* * * * *